May 7, 1946.  W. BAUERSFELD  2,399,847
ANTIFRICTION BEARING
Filed June 24, 1941
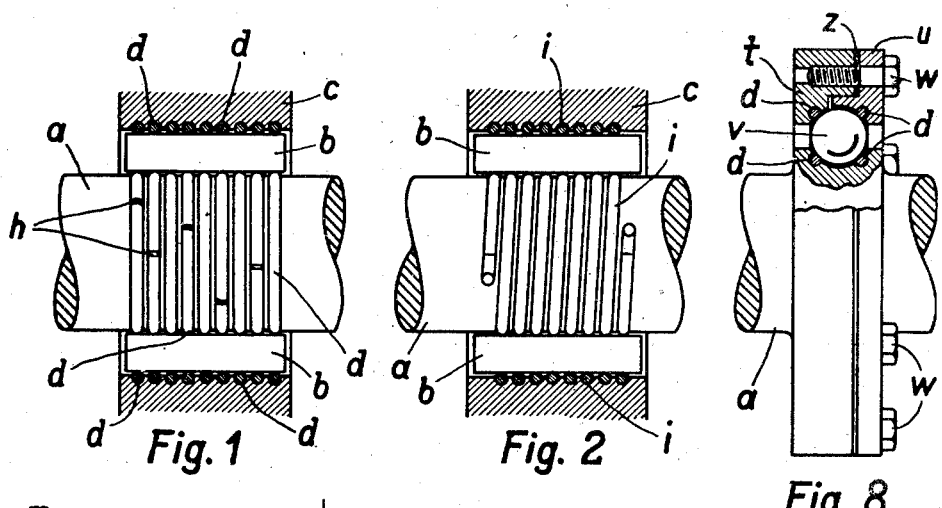
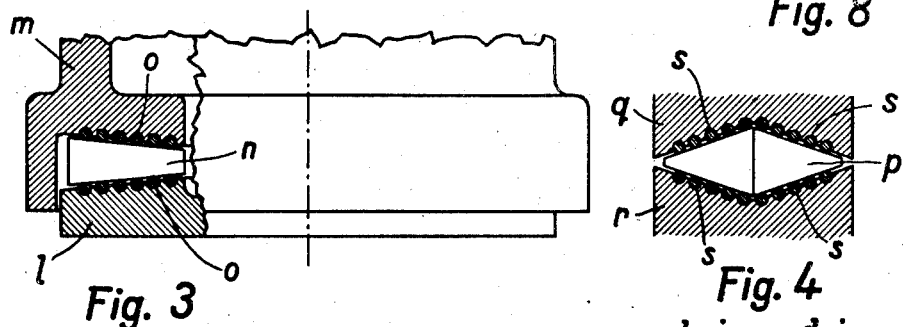
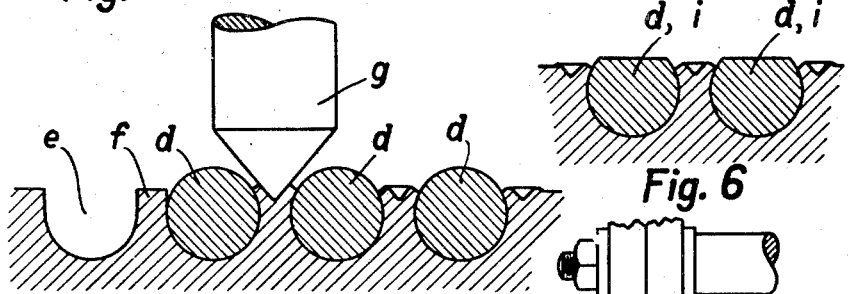
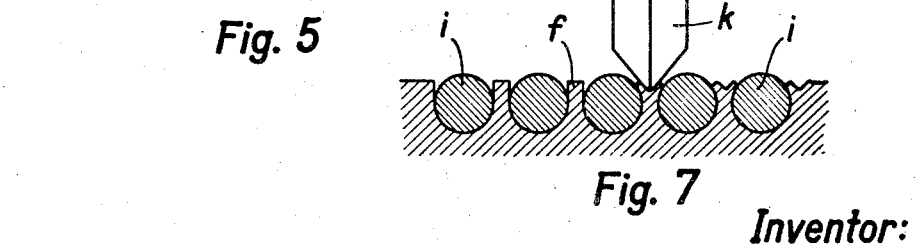
Inventor:
Walther Bauersfeld.

Patented May 7, 1946

2,399,847

UNITED STATES PATENT OFFICE 2,399,847

ANTIFRICTION BEARING

Walther Bauersfeld, Jena, Germany; vested in the Alien Property Custodian

Application June 24, 1941, Serial No. 399,460
In Germany June 15, 1940

10 Claims. (Cl. 308—216)

The material previously resorted to in producing the known types of anti-friction bearings, which are provided with rolls or balls serving as the rolling elements, usually consisted of hardenable steel which, to impart to it a high load capacity, had been subsequently brought to a Brinell hardness of about 650 to 700 by means of a thermal hardening process. After this process the rolling elements same as the bearing elements taking up the rolling elements between them, generally were required to undergo another finishing treatment, i. e., a treatment which on account of the great hardness, could not be applied but by a grinding process. The cost attaching to such bearings is rather high, particularly if the bearings are of a relatively large diameter, the reason being that, to guard against cracking, the cross sections of the hardened bearing parts must have comparatively large dimensions, furthermore, that very much of the material must be ground away on account of the warping to which the bearing parts of larger diameter are subject during hardening, a further reason being that expensive implements are required for carrying out the hardening treatment. Where case hardening is considered adequate for those surfaces which are strained in particular, such as the treads of the bearing parts, cross sections may be kept somewhat smaller and savings made thereby in the cost of material. It must be noted however that treads of bearings produced in that way often tend to develop cracks when subjected to the pressure of rolling elements.

The invention consists in an anti-friction bearing of any optional diameter and whose treads are sufficiently hard without the application of any hardening treatment and whereby the said treads are not subject to the risk of developing cracks, and whereby those parts of bearing surrounding the rolling elements may be made of an ordinary material such as, for instance, of ordinary structural steel, red brass, or the like, which can be easily worked. These advantages can be obtained in that an anti-friction bearing, whose bearing parts in question consist of unhardened material and whose treads consist of parts of the surfaces of hard-drawn steel wires, is so complemented that, as in accordance with the invention, the steel wires are embedded in grooves provided for in said bearing parts and that for the purpose of securing the position of the wires the edges of said grooves are plastically deformed. The invention is not thereby confined to such forms of bearings facilitating a rotary motion and can be just as well employed where two bodies move rectilinearly relative to one another, such as for instance if, by means of a roller bearing, the table of a planer must carry out a reciprocating movement.

Occasionally, anti-friction bearings for facilitating rotary movements will be so designed that the grooves run in plane circles. A design of this kind makes it necessary for each of the wires embedded in a groove to be interrupted at a certain point of the bent wire-ends. The interruption in question is of no disadvantage if the interspace between the wire-ends amounts to only a few tenths of a millimeter and if the breaks of the different wire rings are so arranged that they occur at different places on the circumference. The interruptions of the treads can be avoided, however when the grooves run in curves of uniform pitch. The wire then used consists of one piece applied in a plurality of windings. In cylindrical treads the grooves run in the form of a helix line, while in the case of plane treads as occasioned in end journal bearings they run in the form of a spiral. The forms of the treads obviously can also be conical or toric for instance.

The cross sections of the wires in question may be of any optional form. In addition to wires of circular cross section as mostly used it is also possible to use wires of trapezohedral cross section. Considering however that the latter would have to be made to special order it will be advisable to use wires of circular cross section, such as spring wires or wire-strings which can be readily obtained in the market. For practical purposes the diameters of the wires in question range between 2 and 4 millimeters. At such diameters the Brinell hardness of the wires will be in accordance with requirements, since in a good quality of piano wire strings of, say, 3 mm. in diameter, the Brinell hardness amounts to about 570. Wires thinner than those have a considerably higher Brinell hardness, while in wires of greater diameter the Brinell hardness is lower. Wires of a diameter smaller than 2 mm. are not recommended because of the hardness of such diameters corresponding to that of hardened steel balls, and on account of the surface pressure between the wire and the embedding material being likely to locally increase under the pressure of the rolling elements to an extent occasioning plastic deformations of the embedding body apt to invalidate the bearing or to destroy it altogether.

Theoretical deliberations and practical experiments conformably resulted in the law that, all other conditions being equal, the carrying capacity of the treads of an anti-friction bearing is proportional to the second power of the Brinell hardness of the bearing parts. The Brinell hardness of ordinary structural steel which is expediently used as embedding material is about 100. Providing the treads of a bearing made of said material with embedded piano wire strings 3 mm. in diameter and assuming that, owing to the interruption of the treads between the wires, the carrying surface is reduced by 40 to 50%, an actual rise is obtained in the carrying capacity of the bearing in the proportion of $100^2$ to $0.60 \times 570^2$ to $0.50 \times 570^2$, i. e. from about twenty to sixteen times the load.

Using wires of circular cross section a specially expedient form of bearing is obtained if the width of the wire embedding grooves is equal to the diameter of the wires and their depth about three quarters of said diameter while at the same time giving the bottom areas of the grooves a semi-circular profile. To accentuate the minimum reduction of the carrying surface occasioned by the application of the wires, those parts of the wires protruding from the grooves are recommended to be worked off until the treads show a rectilinear profile.

The method for producing the anti-friction bearings is comparatively simple and therefore inexpensive. On having the bearing body provided with the grooves and the wires inserted, the edges of the grooves can be hand-caulked by means of a center punch where point wise punching is sufficient, or by means of a flat chisel whose cutting edge, which preferably should be blunt, must be held in a position parallel to the wires. Where the bearings are of large diameter, say, of more than one meter, it will be expedient to temporarily fasten the wires on inserting them, i. e., fastening them in points lying five to 10 centimeters apart, while the final fastening is effected when all wires are inserted and temporarily fastened in the aforementioned manner. The wires may also be held in the grooves by applying under high pressure a profiled roll along the edges of the grooves after the wires have been inserted, until the rolled material comes to lie firmly against the wires and thus secures them in position. In the case of the wires having circular cross section, it will be expedient to grind them down in common with the edges of the grooves after the latter have been plastically deformed or, where an essentially smaller carrying surface can be afforded, to so deform the wires by means of a roll or ball adapted to the form of the rolling element, that a carrying surface of sufficiently large size is produced. Yet, apart from the considerably great rolling pressure this method requires owing to the hardness of the wires, the following reasons make this method appear less expedient than the grinding-down process. It has been established that the hardness of the outer layer of the spring steel wires is 30% to 50% less than the hardness of the wire-core. In the case of 3 mm. wires the thickness of said outer layer amounts to about four tenths of a millimeter, while in heavier wires it is substantially thicker. Where the desired greater breadth of the tread on the wires is obtained by rolling, the softer outer layer is preserved, while in the grinding-down process applied for the same reason said layer is eliminated, so that the tread resulting in this case will be considerably harder than by the rolling method.

The annexed drawing shows five constructional examples of the invention. Fig. 1 shows the first example: a section of a roller bearing with the load applied at right angles to the axis of rotation. Fig. 2 shows as the second example and in the same representation another constructional form of the bearing according to Fig. 1. In Fig. 3 a third example is given, partly in section, of a bearing with the load applied in the direction of its axis of rotation. Fig. 4 illustrates the fourth example of a roller bearing according to the invention, represented as a section through a guide. The production of the constructional examples is explained by means of Figs. 5 to 7 which are drawn on an enlarged scale, Fig. 5 showing partly in section the development of the roller race, Fig. 6 the finished roller race, while in Fig. 7 another form of producing the roller race is illustrated. Fig. 8 shows the fifth constructional example, a ball bearing with the load applied at right angles to the axis of rotation, drawn partly in section.

In the case of the first example (Fig. 1) a shaft $a$ is to be disposed by means of rollers $b$ in a bearing bushing $c$. The shaft $a$ as well as the bushing $c$ are made of non-hardened material. The surfaces of these two bearing parts which are to serve as treads for the rollers $b$ are provided with loops $d$ of 3 mm. piano wire-strings embedded in the grooves of bearing parts $a$ and $c$. The grooves run parallel to each other in planes lying at right angles to the rotating axis of the shaft $a$. To secure the position of the wires $d$ the edges of the grooves have been plastically deformed. The method employed in doing so is illustrated in Fig. 5, where the bearing parts are provided with grooves $e$ which are 3 mm. wide and about 225 mm. deep and whose bottom surfaces are semi-circular in profile. On having inserted the wire loops $d$ into the grooves $e$ the edges $f$, which remained standing up when the grooves $e$ were produced, are now plastically deformed point by point of the circumference with the aid of a center punch $g$ until the wire coils $d$ are securely held in place in the grooves $e$ as shown in the right hand part of Fig. 5. This having been done the wires protrude beyond the surface of the bearing part to an extent amounting to about one quarter of the diameter of the wires. On having secured all wire loops $d$ in the bearing parts, whereby it must be noted that there are small interspaces $h$ between the abutting ends of the wires, the protruding parts of the wires are being simultaneously ground down in accordance with Fig. 6, until a carrying surface is obtained with which the rollers $b$ are in linear contact.

In the case of the second constructional example (Fig. 2) the grooves $e$ are disposed in the shaft $a$ and in the bearing bushing $c$. As distinct from the first example, they follow a helix line having a uniform pitch, so that accordingly the inserted wires take the shape of helical springs $i$. To secure the position of the wires the method illustrated in Fig. 7 has been resorted to. Deviating from the method adopted in the first example, a profiled roll $k$ is under pressure traced along the edges $f$ of the grooves thus rolling and pressing said edges against the windings of the helical spring $i$. On having secured the helical spring $i$ in position the protruding parts of the wires are simultaneously ground down according to Fig. 6.

In the third constructional example (Fig. 3) a body $m$ is mounted pivotally about a perpendicular axis on a base plate $l$. Conical rolls $n$ whose inclination is adopted to that of the treads are serving as rolling bodies. Into the treads grooves are worked running in conical spirals. Windings of wire $o$, corresponding to those in the first two examples, are placed into and secured in said grooves and are ground down after having been secured. The rolling elements in the fourth example (Fig. 4) are double-cones $p$. The treads of the bearing parts $q$ and $r$ of a straight slideway have V-shaped profiles. The grooves taking the wires s which are inserted and secured in the same manner, run rectilinearly and parallel to the moving direction of the two parts q and r. After having been secured in the grooves the wires s are being jointly ground down same as in the instance of the other examples. There is a drawback in this example in that sliding friction must be overcome in addition to the rolling friction occasioned between the rolling elements and the treads. Said sliding friction is not however occasioned in the remaining examples and can also be avoided in the guide of the fourth example in that the rolling elements are given the form of cylinders. In the fifth example (Fig. 8) the grooves e, same as in the first example, are disposed on the shaft a and on a two-component bearing bushing t, u, the grooves being arranged in planes upon which the axis of rotation of the shaft a stands perpendicularly, so that the wires d inserted into said grooves and secured therein by a previously described method run in planes which lie parallel to each other. Compared with the first and with the remaining examples this bearing differs insofar as balls v are used in place of the rollers b and of the rolling bodies n and p. In this case the carrying surfaces of wires d are produced through plastic deformation by means of the balls v, in that the two parts t and u of the bearing bushing are brought near each other with the aid of the screws w until by rotating the shaft a or the bearing bushing a carrying surface of adequate size is brought about on the wires. The letter z refers to an adjusting disc.

I claim:

1. An anti-friction bearing comprising a bearing element, a relatively movable adjacent bearing element, at least one of said elements having a grooved surface and being formed of a non-hardened metal, a hardened wearing strip filling said grooves and extending beyond said surface the width of said strip and groove disposed in the plane of said surface being less than the maximum width of said strip disposed within said groove, whereby said strip will be anchored in said non-hardened element, and a rollable body having one of its sides normally engaging said strip and having its opposite side engaging the other of said bearing elements.

2. An anti-friction bearing according to claim 1 in which the peripheral portion of said strip engaging said rollable body is flat and the remaining portion of said strip is circular.

3. An anti-friction bearing comprising a bearing element, a relatively movable adjacent bearing element, at least one of the proximate faces of said elements being formed of a non-hardened metal and having substantially parallel spaced grooves therein, a portion of said grooved element overlying a portion of each groove at the face of said element, hardened wearing material filling each of said grooves and extending beyond the face of the corresponding element to present a wearing surface, whereby said material will be anchored in said non-hardened element, and a rollable body disposed between said wearing surfaces and the other of said bearing elements.

4. An anti-friction bearing according to claim 3 in which the peripheral portion of each of said wearing surfaces adjacent said rollable body is substantially flat and the remaining peripheral portion is arcuate.

5. An anti-friction bearing comprising a bearing element, a relatively movable adjacent bearing element, at least one of the proximate faces of said elements having substantially parallel spaced grooves therein, each groove having a circular cross-section the periphery of which subtends an angle greater than 180 and less than 360 degrees thereby providing restricted longitudinal groove openings in that plane of the associated element face, and hardened wire of circular cross-section filling said grooves and having the remaining cross-sectional area projecting through said groove openings beyond said element face in the form of ridges, and a rollable body having one of its sides normally engaging said ridges, and having its opposite side engaging the other of said bearing elements.

6. An anti-friction bearing according to claim 5 in which said hardened wire has an outer shell of harder material than the material of the associated bearing element, and in which the core of said wire is harder than said shell, said ridges being severed in a plane substantially parallel to the face of the associated bearing element whereby the hard core portion will serve as a wearing surface.

7. An anti-friction bearing comprising a bearing element having a circular bore therein, a rotatable shaft penetrating said bore, the outer periphery of said shaft and the inner periphery of said bore each having substantially parallel spaced grooves therein, each groove having a circular cross-section the periphery of which subtends an angle greater than 180 and less than 360 degrees thereby providing restricted longitudinal groove openings in the plane of the bore periphery and the plane of the shaft periphery respectively, round hardened wire filling said grooves with a portion of its cross-sectional area and having the remaining portion of its cross-sectional area projecting through said groove openings beyond said respective bore and shaft peripheries in the form of ridges, and a plurality of rollable bodies disposed between said ridges projecting from said bore and the ridges projecting from the periphery of said shaft.

8. An anti-friction bearing according to claim 7 in which said ridges are respectively severed in planes substantially parallel to said bore and shaft peripheries.

9. An anti-friction bearing comprising a bearing element having a circular bore therein, a rotatable shaft penetrating said bore, the outer periphery of said shaft and the inner periphery of said bore each having substantially helical grooves therein, each groove having a circular cross-section the periphery of which subtends an angle greater than 180 and less than 360 degrees thereby providing restricted longitudinal groove openings in the plane of the bore periphery and the plane of the shaft periphery respectively, round hardened wire filling said grooves with a portion of its cross-sectional area and having the remaining portion of its cross-sectional area projecting through said groove openings beyond said respective bore and shaft peripheries in the form of ridges, and a plurality of rollable bodies disposed between said ridges projecting from said bore and the ridges projecting from the periphery of said shaft.

10. An anti-friction bearing according to claim 9 in which said ridges are respectively severed in planes substantially parallel to said bore and shaft peripheries.

WALTHER BAUERSFELD.